United States Patent [19]

Jagau et al.

[11] Patent Number: 5,449,438
[45] Date of Patent: Sep. 12, 1995

[54] APPARATUS AND METHOD FOR THE PYROLYSIS OF CRUSHED ORGANIC WASTE MATTER

[75] Inventors: Hermann H. W. Jagau, Buchholz; Richard Schimko, Berlin, both of Germany

[73] Assignee: FORMEX Trading GmbH, Buchholz, Germany

[21] Appl. No.: 99,439

[22] Filed: Jul. 30, 1993

[30] Foreign Application Priority Data

Oct. 6, 1992 [DE] Germany ............... 42 34 385.2

[51] Int. Cl.6 ............................................. C10B 49/00
[52] U.S. Cl. ............................... 201/10; 201/11; 201/25; 201/29; 201/31; 201/32; 201/35
[58] Field of Search ............... 201/10, 11, 25, 29, 201/32, 35, 31; 202/219, 117; 48/92; 585/241

[56] References Cited

U.S. PATENT DOCUMENTS

| | | | |
|---|---|---|---|
| 1,172,682 | 2/1916 | Doherty | 201/11 |
| 2,459,550 | 1/1949 | Stamm | 201/11 |
| 3,770,419 | 11/1973 | Brown | 201/11 |
| 3,977,960 | 8/1976 | Stout | 201/11 |
| 4,029,550 | 6/1977 | Mitsui et al. | 201/25 |
| 4,246,001 | 1/1981 | Bauman | 201/10 |
| 5,085,738 | 2/1992 | Harris et al. | 201/11 |

FOREIGN PATENT DOCUMENTS

| | | | |
|---|---|---|---|
| 115158 | 5/1942 | Australia | 202/219 |
| 0024250A1 | 2/1981 | European Pat. Off. . | |
| 0025319A1 | 3/1981 | European Pat. Off. . | |
| 0070789B1 | 2/1988 | European Pat. Off. . | |
| 329160 | 2/1903 | France | 202/219 |
| 2288139 | 5/1976 | France . | |
| 2219227 | 10/1973 | Germany . | |
| 3614048A1 | 11/1987 | Germany . | |
| 52-10450 | 3/1977 | Japan | 201/10 |
| 2061473 | 5/1981 | United Kingdom | 201/11 |

*Primary Examiner*—Peter Chin
*Attorney, Agent, or Firm*—Spencer, Frank & Schneider

[57] ABSTRACT

Apparatus and method for reprocessing crushed organic waste products, such as rubber waste from worn car tires, by pyrolysis, the method including pyrolytically decomposing the crushed waste products in a pyrolysis bath which is one of a bed or a bath, and which has a temperature ranging from 450° to 550° C., into a mixture including volatilized constituents, liquid constituents, and solid constituents; collecting at least a part of the volatilized constituents from a gas space above the pyrolysis bath and transporting the collected volatilized constituents away from the pyrolysis bath for further utilization; and introducing a gas intermittently or continuously into the gas space above the pyrolysis bath.

12 Claims, 4 Drawing Sheets

APPARATUS AND METHOD FOR THE PYROLYSIS OF CRUSHED ORGANIC WASTE MATTER

BACKGROUND OF THE INVENTION

1. Field of the Invention

The invention relates to a process for reprocessing crushed organic waste products, in particular rubber waste such as worn car tires, by pyrolysis cited in the preamble of claim 1 and to apparatus for carrying out this process.

2. Description of the Related Art

There is a continuous increase in organic waste matter produced, in particular worn car tires and it has reached such a level that depositing of this waste matter is no longer possible to the extent required. The depositing of such matter, moreover, causes problems, since under unfavourable conditions contamination of the groundwater may occur as a result of a leakage of the waste matter which could possibly lead to irreparable damage. A further disadvantage of depositing such matter is that it sometimes includes valuable materials which could be converted into valuable substances by suitable recycling and thus returned to the raw material cycle.

For this reason attempts have been made for some time to decompose this waste matter in suitable pyrolysis plants. The combustible matter (solid, liquid and gaseous mixtures) liberated in the pyrolysis has been used in some cases, either in part or completely, to produce, through combustion, the heat needed for the pyrolysis. Such processes are disclosed, for example, in DE-A-2 219 227, FR-2,288,139, EP-A-0024 250 and DE-A-3 614 048.

Attempts have also been made to bind accompanying substances frequently occurring in this waste matter, such as sulfur contained, for example, in car tires, for the purpose of vulcanization, chlorine or toxic metals, e.g., antimony, vanadium or lead, in the solids accompanying the reaction so that they are not able to escape into the atmosphere and provision of expensive purification processes for the volatile constituents are avoided. EP-A-0 070 789 discloses a process in which these elements are absorbed by chemical reaction in a salt bath of alkali and alkaline earth hydroxides and oxides used for the pyrolysis.

Another possibility for carrying out the process is to produce solid, liquid and gaseous organic basic materials in the pyrolysis. These chemical mixtures may either be used for heat production by means of combustion or for chemical synthesis after a further reprocessing of the mixtures, e.g., by means of a distillation. Unsaturated hydrocarbons, such as alkenes and aromatic substances, are particularly valuable since they may be used directly for chemical syntheses.

Carbon black which is also produced in these processes is, for example, used as an elastomeric filler, in particular in car tires, as pigment in paints, lacquers, plastics materials and in electrophotographic processes or as electrodes in batteries. EP-A-025 319 discloses a process in which the temperatures set for the pyrolysis in pyrolysis plants connected in series are different and the product mixtures produced in the individual parts are removed separately. This reduces the costs for the necessary reprocessing of the product mixtures.

A process is described in FR-2,288,139, in which the pyrolysis of worn car tires is carried out under the exclusion of air. Here the process is carried out at reduced pressure and, in one embodiment disclosed, while feeding overheated water vapor into the reactor. The resultant product gas, however, is contaminated by the water vapor and has to be removed again in a purification process.

All the known processes and apparatus for carrying out the process have the common disadvantage that the resultant product mixture is of a low grade and only contains relatively small amounts of high-grade fractions such as gasoline and kerosene. In most cases, depending on the reaction process, predominantly higher amounts of gaseous products, such as methane and ethane, are obtained. The carbon produced is, moreover, mostly of a lower quality.

The invention has the object of achieving, in a process of the kind mentioned above, as complete as possible a conversion of waste matter into raw materials which are reusable and as pure as possible.

SUMMARY OF THE INVENTION

This object is achieved by a method for reprocessing crushed organic waste products, in particular rubber waste such as worn car tires, by pyrolysis.

The process of the invention is characterized, in particular, in that the organic waste products, preferably old car tires, are subjected to a pyrolysis at reduced pressure and under the exclusion of air and water, the gas mixture produced in the pyrolysis is separated into a gaseous and a liquid phase after cooling and a part of the gaseous phase is then again returned to the gas space above the pyrolysis bath, or an inert gas, such as nitrogen is introduced continuously to the gas space above the pyrolysis bath.

Due to the controlled guidance of the gaseous phase above the reactor in which the pyrolysis takes place, the process may be controlled by the speed of gas supply such that the raw materials passed from the bath into the gaseous atmosphere and intended for re-use achieve an optimum composition and maximal purity. Here, a high gas flow rate, in particular, serves to reduce the amount of carbon in the reaction products and to increase the proportion of higher molecular hydrocarbons within the range of the heating oil fraction compared to the gaseous constituents.

It is thus possible to achieve a better product quality, in particular, which is noted inter alia by a higher proportion of liquid fractions and a lower amount of gaseous products and a greater purity of the carbon also produced.

The first preferred embodiment uses a metal bath as pyrolysis bath, preferably comprising lead, tin or zinc, more particularly tin or lead, and, in another advantageous embodiment, comprising an alloy containing tin and lead, in particular in a ratio of 60:40. In another preferred embodiment, tin is used and is alloyed with zinc, more particularly in a ratio of about 90:10.

A further embodiment relates to the use of a molten salt bath comprising hydroxides, oxides, carbonates and/or other salts of alkali, and/or alkaline earth metals or mixtures thereof.

Another avantageous embodiment is characterized by the use of a sand or gravel bed as pyrolysis bath. Here, the use of other mineral substances, such as silicates or alumosilicates, is also advantageous. They would then be free-flowing materials which are not fluid at the selected temperature and must, therefore, be kept in a permanent state of movement for the purpose of unhindered transfer of heat to the material to be pyrolyzed.

In another embodiment an inert gas, preferably nitrogen, is returned again over the pyrolysis bath instead of using the gaseous component of the product mixture for this purpose.

The invention is based on the finding that an improvement of the achievable product quality may be realized, in particular, by returning the cooled-down gas currents into the pyrolysis reactor. Here, the product gases, present in the gaseous phase over the pyrolysis bath are cooled down quickly by the lower temperature in the gas space, so that the pyrolysis reaction is slowed down accordingly and thus hydrocarbons with a higher molecular weight and in a higher proportion are obtained. Furthermore, the product quality is also determined by how long the product gas produced remains in the gas space of the reactor, since the cooling down of the gases produced and thus the interruption of the pyrolysis reaction is quicker the sooner they are removed from the gas space. By means of the speed parameter for the feed (back) of the gas current over the pyrolysis bath, it is thus possible to adjust the reaction course within wide limits, in which the product to be produced in the process may be varied in its composition, depending on the composition of the waste products to be reprocessed.

BRIEF DESCRIPTION OF THE DRAWING

Other advantageous further developments of the invention are characterized in the subclaims and are more fully explained in the specification with reference to the drawings which illustrate preferred embodiments of the invention:

DESCRIPTION OF THE PREFERRED EMBODIMENT

Figure 1:
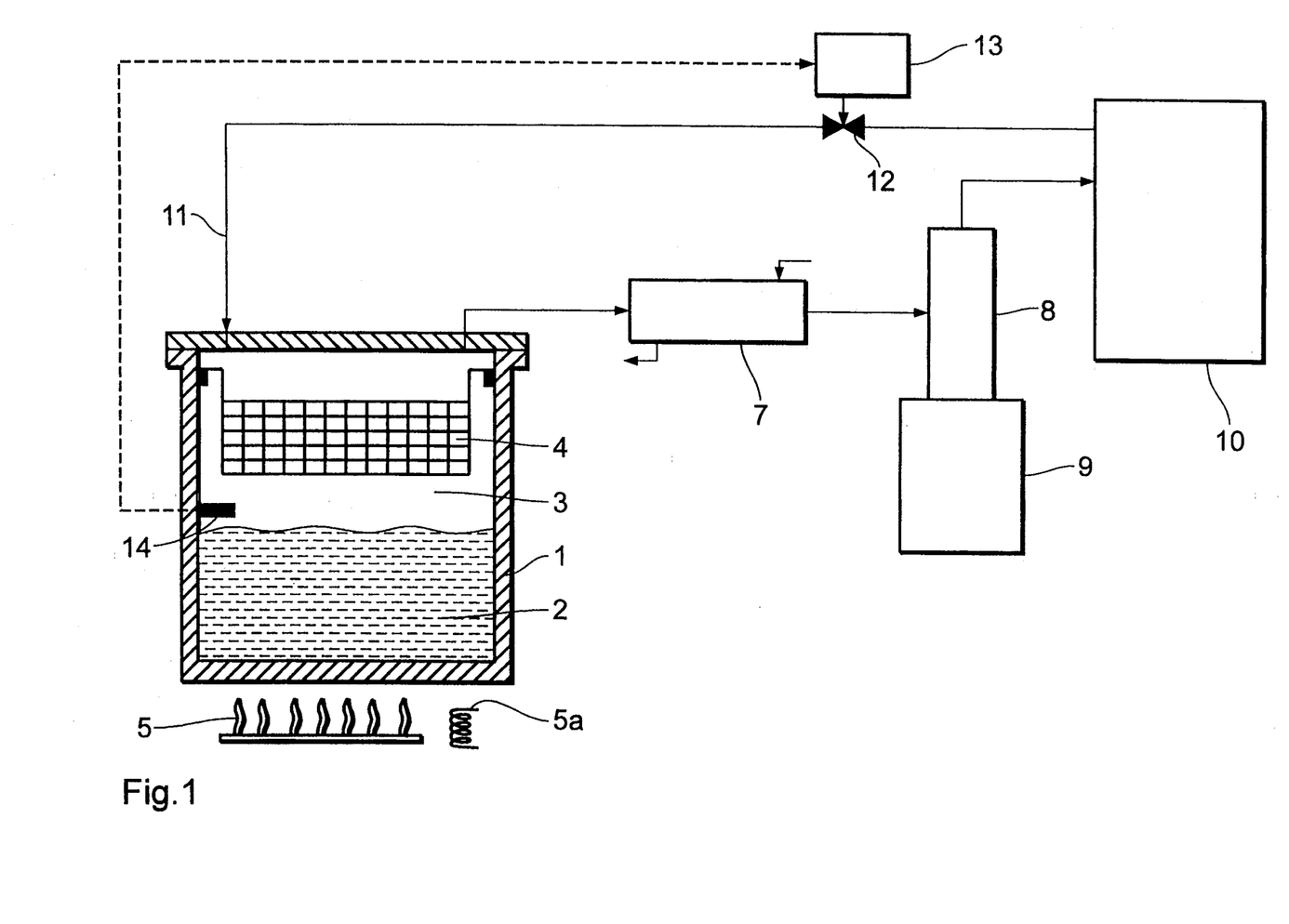
FIG. 1 shows schematically a preferred embodiment for carrying out the inventive process in a batch operation.

A first embodiment of a simple plant for the pyrolysis of small amounts of waste matter is shown in FIG. 1. The car tires or other organic waste products are firstly broken up in order to obtain pieces of about 6×6 centimeters in size. It has been found that the pyrolysis of larger pieces is slower while smaller pieces are more difficult to handle. The specific bulk density of the tire pieces is approximately 0.54 g/cm$^3$.

The pieces are filled into a basket 4 which is introduced into autoclave 1 in such a way that it is suspended in gas space 3 above the pyrolysis bath 2. After the closure of the autoclave, the pyrolysis bath is heated by a burner system 5. A part of the gaseous product mixture may be used for this purpose. Alternatively, it is also possible to use an electric heater 5a. The temperature of the pyrolysis bath may be varied within wide limits. But it has been found that a temperature within the range of from 450° to 550° C., preferably below 500° C., and in an optimal variant between 475° and 485° C., is suitable for producing a product of particularly high quality.

The optimum temperature is derived from the required product composition. Here, a suitable way of influencing the process is that the lower the setting of the temperature, the higher the proportion of compounds with a higher molecular weight. Since the operation is carried out at a relatively low temperature, there is an insignificant loss of the metal by evaporation or reaction with constituents of the material to be pyrolyzed, e.g., sulphur. At temperatures which are lower than those given, the pyrolysis reaction, however, is too slow so that the process becomes uneconomic.

During the heating process, the material to be pyrolyzed is preheated and already reaches an elevated temperature before the immersion into the pyrolysis bath. If the working temperature of the pyrolysis bath has already been reached as a result of a pyrolysis cycle carried out previously, then the material is first preheated before being immersed in the bath in order to achieve a temperature of up to 100° C. This is necessary in order to ensure an optimum product quality, whilst a targeted supply of the waste products with an elevated temperature enables a greater homogeneity of the pyrolysis bath.

The preheating of the material may also be carried out indirectly by heating from outside or by supplying energy via a magnetron from the inside of the material to be pyrolyzed. In this case, however, it has to be remembered that steel insertions are frequently used in car tires. Because of these insertions an energy supply of this kind would cause problems. The above methods may, optionally, also be combined in a suitable manner, by the operations being carried out in parallel or consecutively.

In order to be able to operate without oxygen and water, the gas space in the autoclave is evacuated using a forevacuum pump. The resultant pressure is approximately 0.7 to 0.8 mbar. A higher pressure, however, may also be set. Then an inert gas, e.g. nitrogen, may be introduced into the autoclave, so that a pressure is created between the forevacuum region and the atmospheric pressure. During the operation, a part of the product gas is, moreover, returned to the gas space in the autoclave, according to the invention. The introduction of nitrogen into the reactor, therefore, is only useful and necessary when the plant is first set into operation. If sufficient product gas is available, the pressure in the gas space is maintained merely by the recirculation of gas, so that in this case no further nitrogen needs to be introduced into the gas space. Optionally, the operation is also carried out at the pressure achieved by the forevacuum so that a flushing with nitrogen is only necessary in this case if an air- and water-free gas space is required.

In one embodiment of the invention a metal bath is used as pyrolysis bath, and is made of, e.g., tin, lead, zinc or alloys thereof, preferably tin or lead, or in a particular embodiment of an alloy comprising both tin and lead.

In a preferred embodiment, a mixture of tin and lead is used in a ratio of about 60 parts by weight of tin and 40 parts by weight of lead, which approximately corresponds to the eutectic mixture of this alloy system having a melting point of 183° C. In further preferred embodiments, an alloy of tin and zinc, comprising approximately 90 parts by weight of tin and 10 parts by weight of zinc, which also approximately corresponds to the eutectic mixture of this alloy system with a melting point of 198° C., or an alloy of zinc and lead is used.

Alternatively, a molten salt bath may be used, e.g., consisting of hydroxides, oxides, carbonates and/or other salts of alkali and/or alkaline earth metals or mixtures thereof. The pyrolysis bath may, moreover, be circulated continuously by means of a pump.

In a further embodiment, the material to be pyrolyzed may be placed into a bed of sand or gravel. Other mineral materials which are not liquid at the chosen temperature and must therefore be kept in a permanent state of movement for the purpose of an unimpeded heat transfer onto the material to be pyrolyzed are also suitable. In this case, analogous to the fluidised bed reactor, the bed is permanently kept in motion by a gas-inflow from the lower side of the bed so that the solid reacts like a fluid.

This embodiment has the advantage that a highly effective heat transfer is effected from the container wall onto the pyrolysis bath or that the heat is directly supplied via the gas blown in. In a particular embodiment, the gas returned to the autoclave, according to the invention, is used to keep the fluidized bed in motion, by blowing the returned gas into it from the lower side of the autoclave.

When the working temperature of the pyrolysis bath is reached, the basket containing the pyrolysis material is immersed in the bath in order to start the reaction. After about 1 minute gas begins to develop. As a result of the pyrolysis, the organic waste products are converted into products which are gaseous, liquid and solid at ambient temperature. The reaction time is about 10 to 14 minutes. The solid substances consisting of carbon and optionally steel netting from the tire reinforcement largely remain in the basket and may be separately recovered after the pyrolysis.

The gaseous products are continuously removed from the gas space of the autoclave and are cooled in a condenser 7. Then, the product mixture is introduced into a cooling column 8 from which the liquid fraction is supplied to container 9. A kilogram of old car tires thus produces 0.5 to 0.6 liters of oil.

The remaining gas mixture consists of methane and ethane in a ratio of 8:1. The gases are fed to the gasometer 10 and stored there in the meantime.

According to the invention, the gaseous amount of the product mixture is returned, via a conduit 11, to the gas space above the pyrolysis bath. The volume current of the returned gas is adjusted by means of valve 12 which may be controlled by a control unit 13. The volume current is adjusted by the pump according to the required pressure or chosen temperature of the gas space above the pyrolysis bath and the product composition obtained. A pressure or temperature sensor 14 arranged at the height of the gas space in the autoclave is provided for this purpose.

The characterization of the product composition may be carried out by the determining the quantitative ratio between the gaseous and liquid products at ambient temperature. Furthermore, chromatographic methods, such as measurement of the heat conductivity or spectroscopic methods, may be used. In a partially or fully automatic process, the initial values of these measuring appliances which measure the composition of the product flow continuously are compared with predetermined theoretical values. Possible variations form the input values for a relevant adjustment member of the control unit 13, which then changes the quantitative flow to correspond to the desired composition.

As a result of the return of the gaseous component, the gas space in the reactor is cooled down compared to the pyrolysis bath. The decomposition reactions of the pyrolysis material are thus slowed down or stopped altogether, resulting in an improved product quality.

The volatile constituents produced during the pyrolysis form, together with the gas supplied to the reactor by the gas return and the inert cleansing gas, e.g., nitrogen, in the gas space above the pyrolysis bath. The temperature in the gas space is kept preferably at 200° to 250° C. so that there is a temperature gradient between the pyrolysis bath and the gas space positioned above. This method results in the volatile constituents of the product mixture, issuing from the pyrolysis bath, being cooled to the lower temperature and thus in the decomposition reaction of the organic compounds, obtained from the material to be pyrolyzed, being suddenly brought to a standstill or at least to the speed thereof being reduced.

A part of the gaseous product mixture may be used for the heating of the pyrolysis bath in the reactor, itself. Moreover, in the event of a sand or gravel bed being used in the fluidized bed method, the gaseous product mixture may also serve to maintain the fluidized bed through injection into the lower part of the pyrolysis bed. Alternatively, nitrogen may also be introduced as inert gas for this purpose. The gas used for injection may be heated before it is introduced into the pyrolysis bed in order to supply heat thereto.

Figure 2:
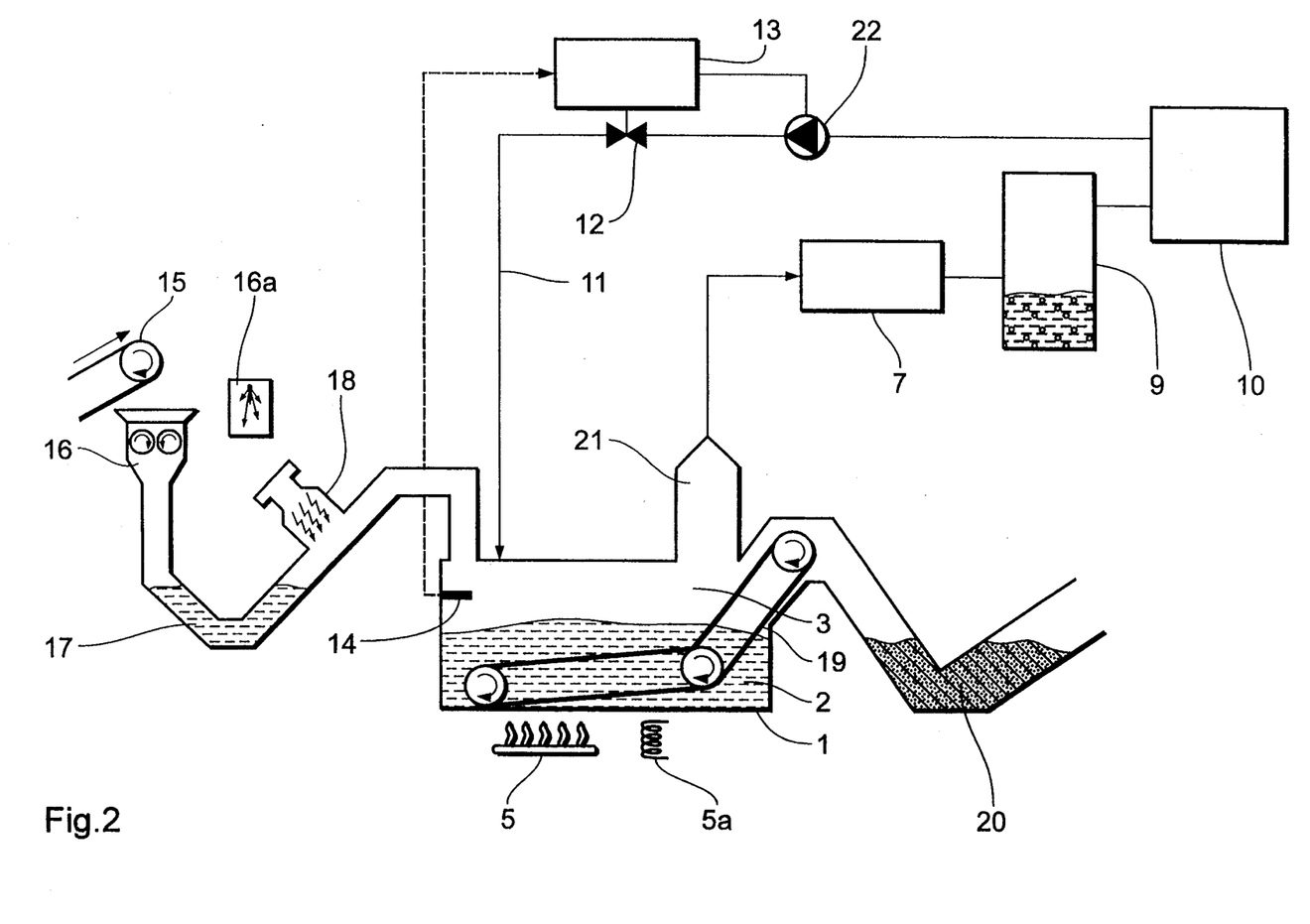
FIG. 2 shows another preferred embodiment of the inventive apparatus for the continuous pyrolysis operation.

FIG. 2 shows another preferred embodiment of the apparatus according to the invention.

The car tires or other organic waste products are first delivered via a conveying apparatus 15, e.g., a conveyor belt, to crushing plant 16, in which the old car tires are cut up into small pieces by a shredder or cutting apparatus. Otherwise the car tires may be broken up by a laser apparatus 16a.

The tire sections then pass through a gas-tight passage 17 in order to prevent air from entering into the pyrolysis chamber. An oil bath may, for example, be used for this purpose. This ensures that the product mixture is not contaminated by carbon monoxide, carbon dioxide, water or other oxidation products. A maximum amount of the required product mixtures is thus obtained.

Then, the tire sections pass through a pre-heating zone 18 in which the parts are heated to a temperature of about 180° C. A greater homogeneity of the pyrolysis bath, as a result of a targeted supply of the tire sections with an elevated temperature, is thus possible. When this preferred measure is used, it is much easier to keep the temperature constant in the pyrolysis bath so that a temperature variation in the bath is not even caused by differing quantitative flows of the material to be pyrolyzed, and the product quality thus remains constant. Again, the pre-heating of the material may be carried out either indirectly via heating from outside or by supplying energy via a magnetron from inside the pyrolysis material.

The pre-heated material then reaches the reactor 1, in which the pyrolysis bath 2 is in contact with a gas space 3. The reactor is continuously flushed with an inert gas, preferably nitrogen, for a completely oxygen- and water-free operation. Furthermore, the reaction space is continuously kept at partial vacuum by a pump system, preferably at about 100 mbar. Adjustment to other values, typically from 80 to 150 mbar, however, is also possible.

In this event a metal bath, preferably consisting of tin, tin/lead or tin/zinc, a salt bath or a sand or gravel bed may be used.

The heating of the pyrolysis bath is carried out from outside by a burner system 5 in which, e.g., a part of the product gas obtained is burnt. The heating may also be effected by an electric heater 5a. The temperature of the pyrolysis bath is again within the range of between 450° and 550° C., preferably below 500° C., and, in an optimum variant, between 475° and 485° C.

Under the chosen process parameters, the sulfur contained in the car tires is not bound, but it is sublimated and enriched in the oil phase of the product mixture. This enables a simple separation of this impurity without requiring expensive purification and working-up.

The carbon produced in the pyrolysis is deposited, like the reinforcement materials of the car tires, on a conveyor apparatus 19, at the bottom of the reactor. These solids are discharged from the reactor via a gas-tight passage 20 and then cooled down. The carbon is separated from the other, non-melting constituents and then dried. Characteristically, it contains at least 95% carbon, 0.2 to 0.5% sulfur, 1.5% of extremely high-boiling hydrocarbons and optionally small amounts of asphalt. Because of the high purity, the recovered product may thus easily be used as an original raw material in many applications.

The temperature in the gas space above the pyrolysis bath is kept at 200° to 250° C. The volatile constituents of the product mixture are passed, via dome 21, into the condenser 7, in which the high-boiling organic constituents are separated. This fraction is largely free from extremely high-boiling hydrocarbons. The waste heat produced in the condenser may be used for drying the carbon obtained in the separator. The remaining volatile fraction is passed into a separator 9 which separates the gaseous compounds, methane and ethane, from the liquid products. A mixture of about 30% of gasoline having a boiling point of less than 180° C., 30 to 35% of kerosene having a boiling point of above 180° C. and up to 40% of light medium and heavy oils are obtained in the liquid fraction. The gas mixture contains methane and ethane in a ratio of about 8 to 1. A small amount of nitrogen which is supplied to the reactor as inert gas is also contained in the gaseous phase.

According to the invention, the gaseous part of the product mixture is returned, via a conduit 11, to the gas space 3 above the pyrolysis bath 2, by means of a pump 22. The quantitative flow of the gas may be controlled via a control unit 13. The volume current is adjusted by the pump to correspond to the required pressure or set temperature of the gas space above the pyrolysis bath and product composition obtained. The output of the pump may be adjusted for this purpose. The adjustment of the volume current by means of the valve 12 is another possibility. The control is effected by measuring the pressure in the gas space in the reactor, by means of sensor 14.

Figure 3:
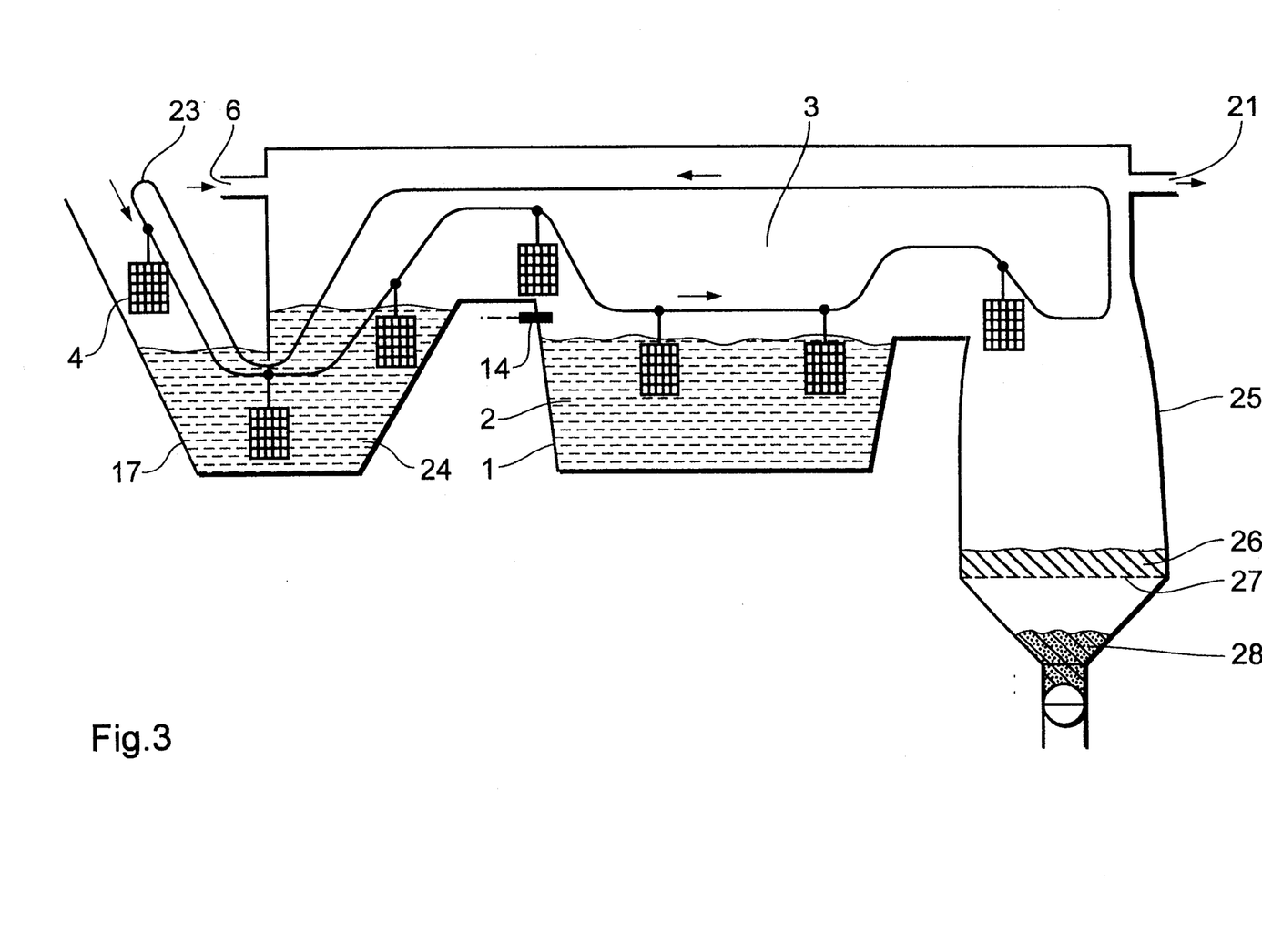
FIG. 3 shows schematically a further preferred embodiment for the continuous operation using different arrangements for transporting the waste products in the pyrolysis plant.

FIG. 3 shows a third preferred construction of the apparatus according to the invention.

The broken up parts of the organic waste products are used to fill baskets 4 suspended on a conveyer belt 23. The pyrolysis material is first heated up to a temperature below 100° C. Then, the baskets are passed to the reaction space through a gas-tight sluice preferably filled with oil 24. For a further warming of the organic waste products, the oil may be heated to an elevated temperature. The high-boiling parts of the product mixture may, preferably, be used for the oil filling. The oil dragged into the inside of the reactor by the baskets is thus evaporated and combined with the other product gases. This results in a closed oil cycle.

The baskets filled with the pyrolysis material are then passed into the reactor 1 and immersed there in the pyrolysis bath 2. The temperature set in the pyrolysis bath corresponds to the values given in the preceding Examples. The pressure in the gas space 3 is within the range of from 600 to 1000 mbar and preferably largely about 800 mbar. The organic waste products are broken up by the pyrolysis reaction. What remains are carbon and optionally the fillers contained in the waste products such as steel netting insertions.

After having passed through the reaction space, the baskets are transferred to a solids separator 25 in which the baskets are automatically emptied by means of a suitable apparatus. The solids fall onto a sieve tray 27 where the larger parts 26, e.g., the fillers, remain. Any steel netting may be removed from the sieve tray by means of magnets. Powdery carbon 28 falls through the sieve tray and collects in the lower part of the solids separator. The emptied baskets (not shown) are returned on the conveyer belt passing through the plant.

The product gas produced, and the inert gas optionally introduced for rinsing the gas space, are expelled through outlet 21 where, in apparatus shown in FIG. 1, first a cooling of the product mixture in a condenser and then a condensation in a cooling column take place. The condensed parts are collected in a container whereas the gaseous parts pass into a gasometer where they are stored for the time being.

According to the invention, in this case again a part of the gaseous parts of the product mixture is returned by means of a feedback via inlet 6. The volume current of the returned gas is adjusted via a valve. Either the pressure or the temperature in the gas space or the product composition obtained serve as control parameters. The pressure or the temperature may be determined continuously via a sensor 14 arranged at the level of the gas space in the reactor. The determination of the product composition is carried out in the manner described above. Alternatively, the volume current of the returned gas may also be adjusted by means of the output of a pump delivering the gas.

Figure 4:
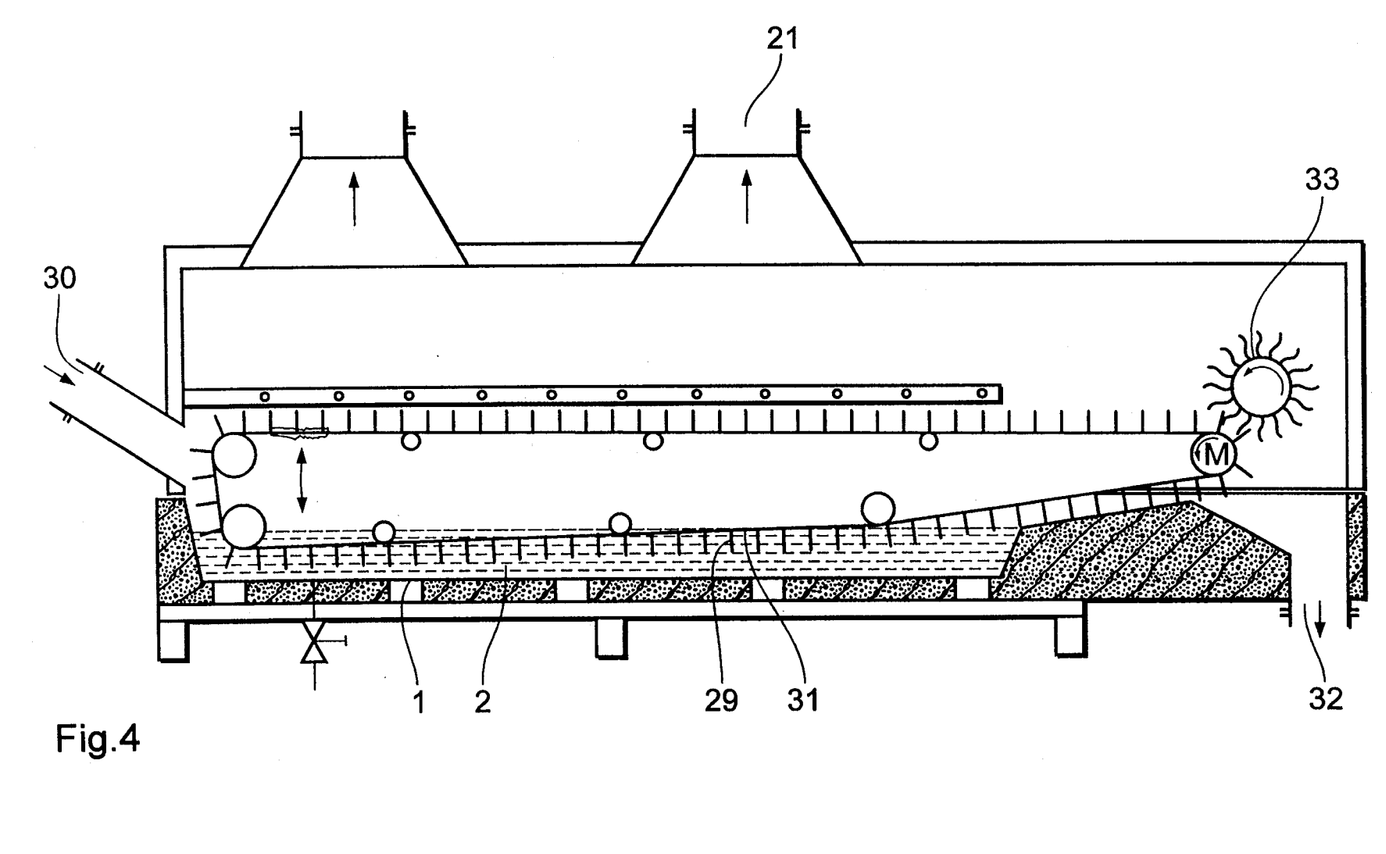
FIG. 4 shows another preferred construction for the continuous operation, in which the material to be pyrolyzed is transported through the pyrolysis chamber by means of a specially constructed conveyor belt.

A further embodiment of the apparatus according to the invention is shown in FIG. 4. The pyrolysis material broken up into individual pieces is supplied to reactor 1 via inlet 30 and from there passes into the pyrolysis bath. In contrast to the apparatus shown in FIG. 3, the transport of the tire sections or the solids remnants in the bath is carried out by a conveyor belt 31 on which apparatus 29 are arranged at predetermined spacings, said apparatus projecting at right angles from the conveyor belt and propelling the pyrolysis material or the resultant solids remnants in the metal bath. The pressure and temperature conditions in the reactor correspond to those described in the preceding embodiments.

The gaseous products are discharged via dome 21 and further processed in the apparatus shown in FIGS. 2 and 3.

According to the invention, in this case again, a part of the gaseous parts of the product mixture is returned to the gas space in the reactor by means of a feedback. The volume current of the returned gas is adjusted as a function of the pressure or temperature in the gas space or of the product composition obtained. The same process conditions as those relevant in the preceding embodiments apply.

The remaining solids pass into a solids retreatment plant via shaft 32. To this end, conveyor belt 31 and apparatus 39 are cleaned by means of a cleaning brush 33 which wipes off the solid matter.

In the solids retreatment plant, the solids, containing not only carbon but also metal parts, are first ground in a crushing mill. Then the metal parts are removed from the mixture by a magnetic separator and the carbon is then passed over a sieve. This is followed by a fine grinding process.

EXAMPLE

In the apparatus shown in FIG. 1, the pyrolysis of different tire types is carried out at a temperature of between 475° to 485° C. The pyrolysis takes place in a lead/tin or a tin/zinc bath in a ratio of composition of 40:60 or 90:10. An oil-, a gas-, and a carbon-fraction are produced.

Using the mean value ascertained from various tire types, the process is selected such that the following composition of the product parts in the atmosphere above the metal bath is obtained.

| Boiling Point | Part by volume |
|---|---|
| up to 180° C. | 20 to 27% |
| up to 240° C. | 5 to 18% |
| up to 300° C. | 10 to 25% |
| up to 350° C. | 10 to 20% |
| up to 400° C. | 20 to 25% |
| above 400° C. | 10 to 15% |

The proportion of unsaturated compounds is high and amounts to between 80 and 90% (alkenes, substituted aromatic substances and others). The remaining proportion consists of saturated compounds (alkanes and paraffins). The amount of sulfur contained in the low-boiling fractions is $\leq 0.2\%$, the water content $\leq 2\%$.

In a pyrolyzed tire sample, the following gas mixture was obtained:

| Boiling Point | Part by volume |
|---|---|
| up to 180° C. | 25% by volume |
| up to 240° C. | 15% by volume |
| up to 300° C. | 18% by volume |
| up to 350° C. | 12% by volume |
| up to 400° C. | 20% by volume |
| above 400° C. | 10% by volume |

The gas fraction largely contains alkanes or small amounts of alkenes, as well as traces of mercapto compounds:

| Methane | 70 to 85% by volume |
|---|---|
| Ethane, ethene | 10 to 15% by volume |
| Propane, propene | 2 to 5% by volume |
| Hydrogen | 0 to 5% by volume |

In a pyrolyzed tire sample, the following gas mixture was obtained:

| Methane | 75% by volume |
|---|---|
| Ethane, ethene | 10 to 25% by volume |
| Propane, propene | 2 to 5% by volume |
| Hydrogen | 5% by volume |

After removing the steel, the composition of the carbon fraction is as follows:

| Carbon | 80 to 95% |
|---|---|
| Mineral substituents | 3 to 15% |
| Extremely high-boiling hydrocarbons | 3 to 10% |
| Water | 1 to 3% |

The implementation of the invention is not limited to the above preferred embodiment. On the contrary, many different variants are possible which use the solution described despite being of a different basic construction.

What is claimed is:

1. A method for reprocessing crushed organic waste products including rubber waste from worn car tires, by pyrolysis, comprising:
   a. pyrolyrically decomposing the crushed waste products in a reactor comprised of one of a pyrolysis bed or a pyrolysis bath which has a temperature ranging from 450° to 550° C. into a mixture including volatilized constituents, liquid constituents, and solid constituents;
   b. collecting at least a part of the volatilized constituents from a gas space above the one of a pyrolysis bed or pyrolysis bath and transporting the collected volatilized constituents away from the reactor for further utilization; and
   c. returning at least a part of the volatilized constituents collected and transported away in step (b) by introducing same intermittently or continuously into the gas space as a gas feedback flow having a flow volume, which at least a part is composed of low molecular weight materials,
   the flow volume of the gas feedback flow being adjusted according to a preselected product composition of the mixture obtained by the pyrolysis.

2. The method according to claim 1, further comprising introducing an inert gas into the gas space intermittently or continuously.

3. The method according to claim 1, wherein the flow volume of the gas feedback flow is additionally adjusted according to a preselected value of at least one of (1) pressure in the gas space above the pyrolysis bath and (2) temperature in the gas space above the pyrolysis bath.

4. The method according to claim 1, wherein the gas space has a temperature ranging from 200° to 280° C.

5. The method according to claim 1, wherein the one of a pyrolysis bed or a pyrolysis bath has a temperature ranging from 475° to 485° C.

6. The method according to claim 1, wherein the one of a pyrolysis bed or a pyrolysis bath is a pyrolysis bath, which pyrolysis bath consists of a metal bath.

7. The method according to claim 6, wherein the metal bath comprises at least one element selected from the group consisting of tin, lead and zinc.

8. The method according to claim 7, wherein the metal bath comprises a mixture of one of (a) tin and lead in a mass ratio of 60% tin and 40% lead, or (b) tin and zinc in a mass ratio of 90% tin and 10% zinc.

9. The method according to claim 1, wherein the one of a pyrolysis bed or a pyrolysis bath is selected from the group consisting of a molten salt bath, a sand bed, and a gravel bed.

10. The method according to claim 9, wherein the one of a pyrolysis bed or a pyrolysis bath is a pyrolysis bed which is a fluidized bed composed of one of sand or gravel.

11. The method according to claim 1, wherein the pyrolytic decomposition is carried out at reduced pressure.

12. The method according to claim 1, wherein the pyrolytic decomposition is carried out under the exclusion of at least one of oxygen, air, and water.

* * * * *